United States Patent

Bruning et al.

[11] 3,963,550
[45] June 15, 1976

[54] GRAIN DOOR AND METHOD OF MAKING

[75] Inventors: William E. Bruning; Michael J. Ford, both of Omaha, Nebr.

[73] Assignee: Omni Corporation, Omaha, Nebr.

[22] Filed: Oct. 21, 1974

[21] Appl. No.: 516,216

Related U.S. Application Data

[62] Division of Ser. No. 389,951, Aug. 20, 1973.

[52] U.S. Cl. ............................. 156/252; 156/212; 156/263; 156/309; 160/368 G
[51] Int. Cl.² ............................................ B32B 31/04
[58] Field of Search ........... 156/210, 252, 263, 290, 156/309, 256, 216; 160/368 G

[56] References Cited
UNITED STATES PATENTS

| | | | |
|---|---|---|---|
| 2,739,635 | 3/1956 | Seaborne et al. | 156/291 |
| 3,032,453 | 5/1962 | Ford | 160/368 G |
| 3,216,483 | 11/1965 | Ford | 160/368 G |
| 3,394,753 | 7/1968 | Magnuson et al. | 160/368 G |

FOREIGN PATENTS OR APPLICATIONS

| | | | |
|---|---|---|---|
| 719,474 | 10/1965 | Canada | 160/368 G |

*Primary Examiner*—Edward G. Whitby
*Attorney, Agent, or Firm*—Dawson, Tilton, Fallon & Lungmus

[57] ABSTRACT

A grain door and method of making the same wherein thin metallic straps having arcuate ends are partially adhesively secured to a double-face corrugated medium, and wherein the straps may be equipped with novel fittings for extension bands and are also adapted for receipt of center braces having horizontally flat tangs.

1 Claim, 15 Drawing Figures

U.S. Patent   June 15, 1976   Sheet 1 of 3   3,963,550
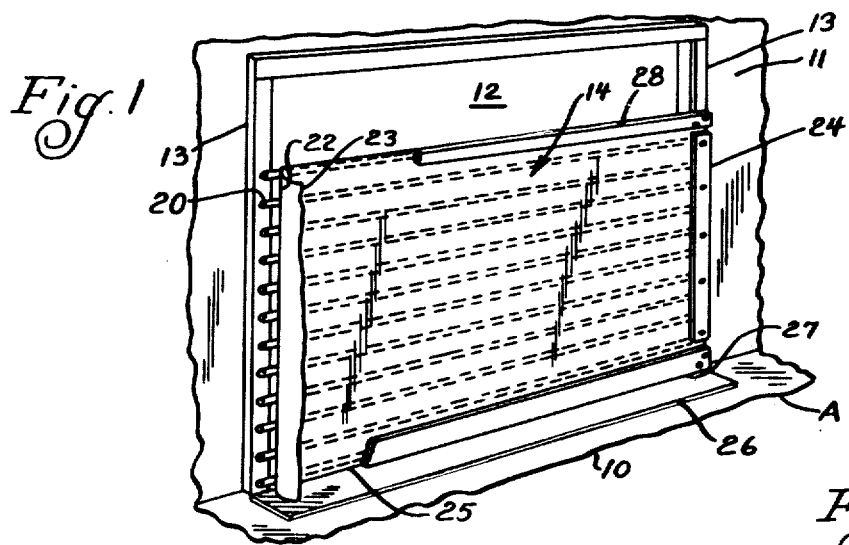
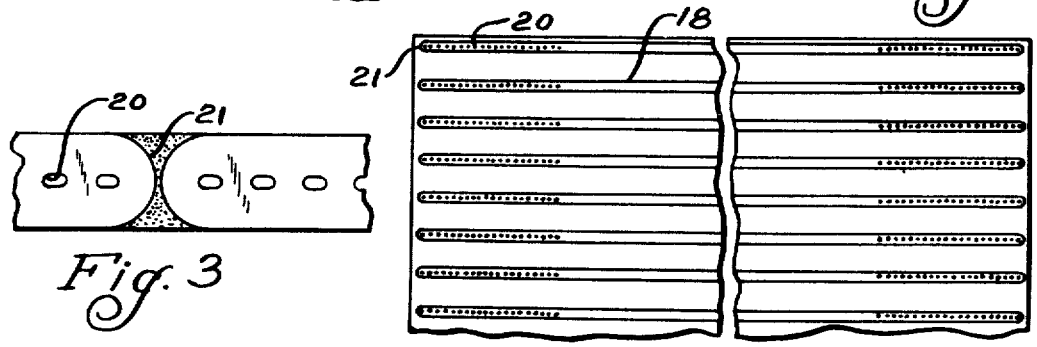
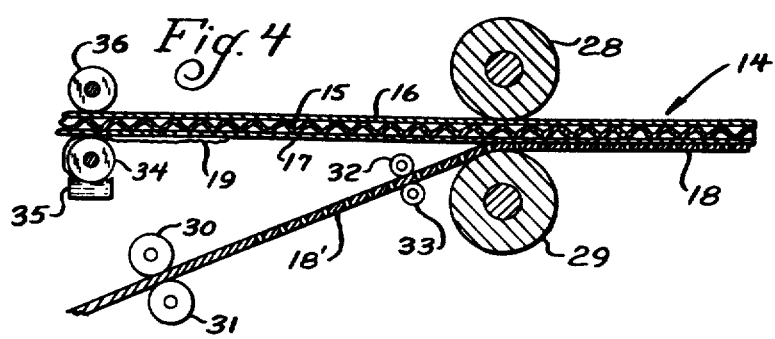
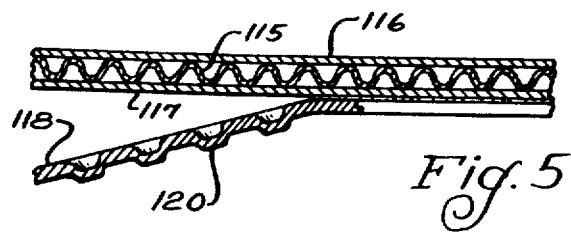

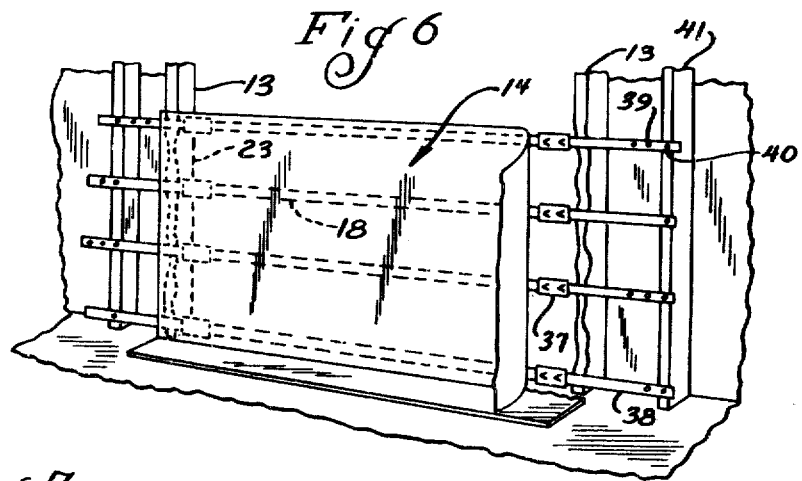
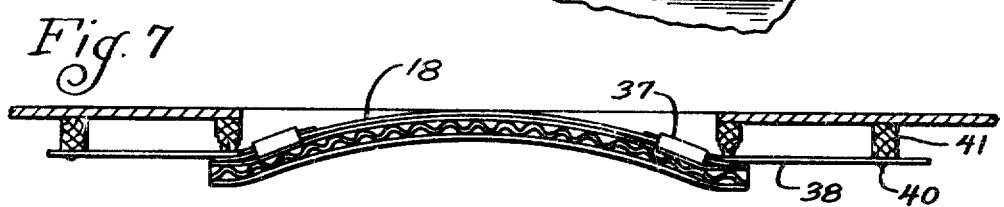
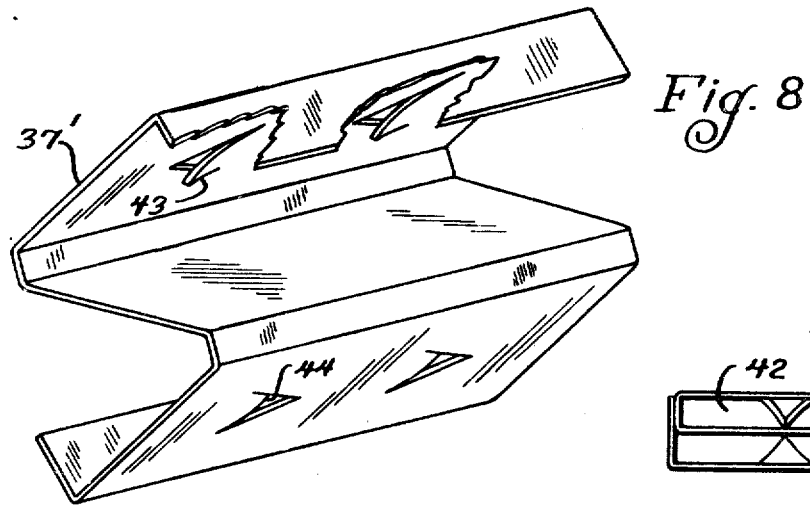
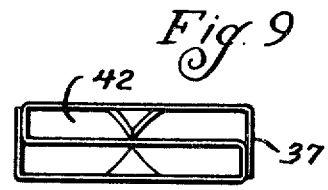
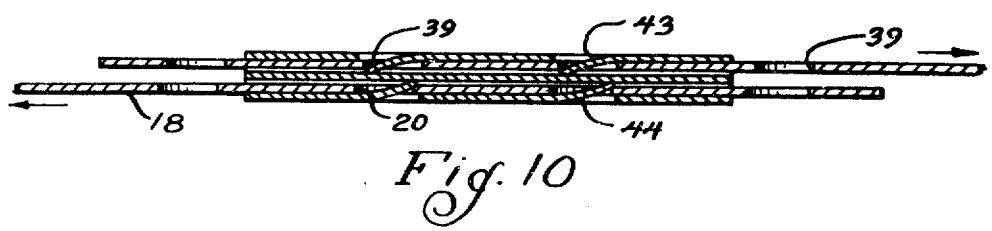

GRAIN DOOR AND METHOD OF MAKING

This is a division of application Ser. No. 389,951, filed Aug. 20, 1973.

BACKGROUND AND SUMMARY OF INVENTION:

For many years boxcars have been converted to vehicles for carrying grain or other particle-type material by installing temporary barriers across the doorways. The doorways normally are closed by sliding storm doors but these are incapable of serving as grain barriers, viz., the storm doors must be opened during the loading operation and it will be appreciated that as soon as the grain is delivered into the car, it would flow out. Thus, over the years, the art workers have provided temporary doors, usually reinforced by thin steel strapping. For the most part in the last decade or two, these temporary doors have had the straps embedded within the paperboard, i.e., covered by the outer sheet or face of the paperboard, this being true whether the paperboard panel was equipped with a corrugated core or not.

We have found that an extremely effective yet simple temporary door can be achieved by securing the horizontally extending, vertically spaced straps to the outside of the door panel. This insures that the entire panel serves as a barrier, not just selected thicknesses thereof. Further, we limitedly secure, as by adhesive, these straps to the door exterior and limit the length of the straps to slightly less than the width of the door panel — and at the same time arcuately transversely severing the straps to substantially minimize the possibility of any injury to the installing artisan.

Inasmuch as the boxcar door posts over the years usually become splintered or otherwise incapable of adequately securing the straps, we provide additionally, when needed, a novel connection for extension bands which can be used to anchor the door to adjoining studs.

For especially wide doors, those in the art have used center braces, i.e., vertical members cross tied together across the car to limit the unsupported span. We have developed a new center brace member which coacts with the door in a novel fashion through the use of a horizontally flat tang extending through a slit in the straps to provide a superior and exceedingly effective reinforcement.

Other advantages may be seen in the details of manufacture, construction and operation as this specification proceeds.

DETAILED DESCRIPTION

The invention is described in conjunction with the accompanying drawing, in which;

FIG. 1 is a fragmentary perspective view, partially broken away, of the inventive door installed in the interior of a grain carrying freight car;

FIG. 2 is a fragmentary elevational view of the inventive door as would be viewed from the side having the straps affixed thereto;

FIG. 3 is an enlarged fragmentary elevational view of a portion of the door and showing a modified version of nail hole;

FIG. 4 is a sectional view, partially schematic, showing equipment employed in the manufacture of the inventive grain door;

FIG. 5 is a longitudinal sectional view in fragmentary form, showing a modified form of strap arrangement;

FIG. 6 is a view similar to FIG. 1 in being a fragmentary perspective view of the interior of a boxcar but wherein the door straps are equipped with extension bands;

FIG. 7 is a fragmentary longitudinal sectional view of the structure shown in FIG. 6;

FIG. 8 is a perspective view on enlarged scale of the inventive connector for extension bands but in an intermediate state of manufacture;

FIG. 9 is an end elevational view of the inventive connector;

FIG. 10 is a longitudinal sectional view on enlarged scale showing the connector installed in the fashion seen also in FIG. 6;

Figure 11:
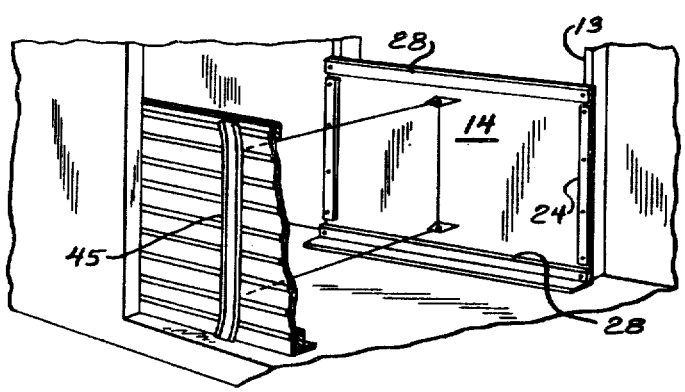
FIG. 11 is a fragmentary perspective view of the inventive door equipped with center braces according to the invention.
Figure 12:
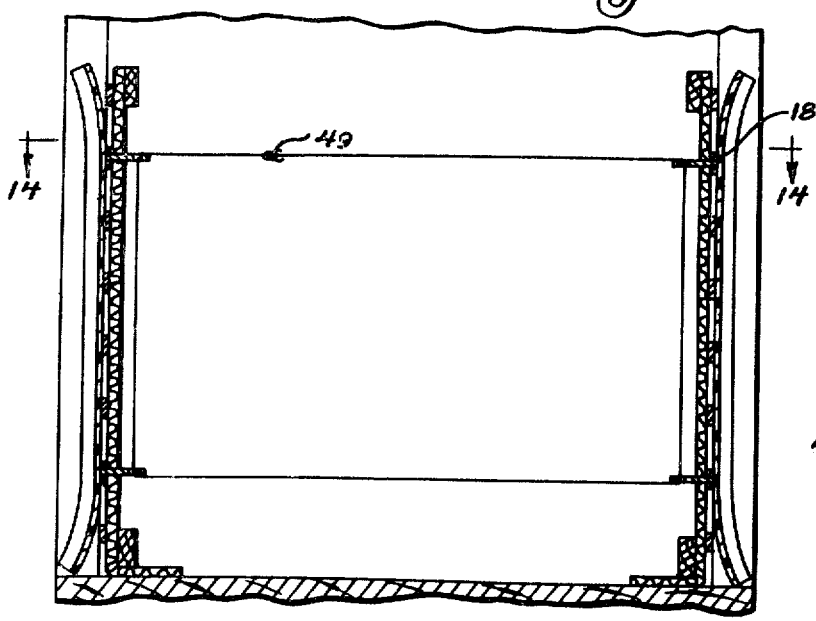
FIG. 12 is a sectional view of the construction seen in FIG. 9 and also in fragmentary form.
Figure 13:
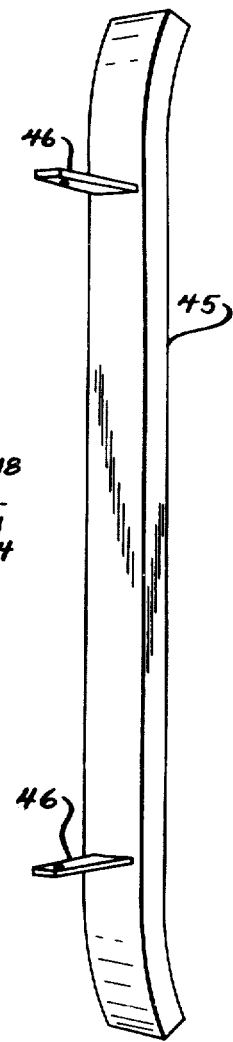
FIG. 13 is a perspective view of the inventive center brace member.

In the illustration given and first with reference to FIG. 1, the symbol A designates generally a grain carrying freight car, i.e., a boxcar, which is shown only in fragmentary form. The car includes the usual walls, roof, floor, sliding storm doors, undercarriage, etc. For simplicity of presentation, we designate only the floor 10 and sidewalls 11. The sidewalls 11 are interrupted by a doorway 12 which is defined in part by door posts 13. Extending across the doorway 12 and secured to the door posts 13 is the inventive door 14.

The door 14 includes a double face corrugated medium or panel in which the corrugated core is designated 15 (see FIG. 4) encased between outer liners or faces 16 and 17. Secured to the outwardly facing line 17 are a plurality of horizontally extending, vertically spaced apart straps 18. For the purpose of securing the straps 18 to the liner 18, the liner 17 is equipped with stripes of adhesive 19 (see FIG. 4).

Adjacent the ends of each strap 18 we provide a plurality of positions for receiving nails which secure the straps to the door frames 13. In the embodiment of the invention depicted in FIGS. 1-2, the positions 20 are punched openings. In some cases it is advantageous to longitudinally elongate the openings to provide a length three times or so the width of the opening as seen in FIG. 3. In the embodiment seen in FIG. 5, the position designated 120 in the strap 118 are only partially punched so as to result in circular projections or embossments. These define convenient nailing positions but do not deprive the strap 118 of any strength. Thus, it is possible to space the embossments 12o on closer centers, i.e., ⅜ inch spacing as contrasted to the usual ¾ inch spacing of the openings 20 in the embodiment of FIGS. 1-2. The narrower spacing is especially advantageous in connection with doorway nailing posts (not shown) which have fixed nail receiving grooves. Thus, there is little leeway for the position of the nail in each strap end. During manufacture, it is difficult to precisely position the nailing positions 20 and a cumulative error develops which results in the desired nail position being out of alignment with the door post portion intended to receive the associated nail. Thus, it is necessary to slacken the strap which results in a substantial bulge when ¾ inch is involved. However, we can substantially limit this slackening through the use of the emboss feature of FIG. 5. In FIG. 5, it will be seen that the protruding portion of the embossment 120 is on the side of the strap 18 remote or away from the outer liner 117, the door being made up of the inner liner 116 which, with the liner 117, confines the corrugated core 115.

The straps 18 are seen to have rounded end portions 21 (see FIGS. 2 and 3) and these end portions 21 preferably lie slightly within the confines of the adjacent edge of the door panel 14.

In the installation of the door 14, the paper board portion which includes the elements 15-17, is equipped with score or fold lines 22 (see FIG. 1) which permit the vertical side edges of the door panels to be folded inwardly so as to develop side flaps 23. Thereafter, nails are driven through the position 20 into the door posts 13 and the flap return into planar condition with the remainder of the door — this being depicted at the right hand end of FIG. 1. Thereafter, a batten 24 or like securing member is installed over the now unfolded flat 23 and secured to the door post 13. Also, we can provide a longitudinally extending score line 25 (see FIG. 1) which is below the lowest strap 18 and which permits the development of a floor flat 26 to lie against the floor 10. A ply board 27 may be nailed above the flat 26 and a headboard 28 may be secured over the top portion of the door 14.

In the method of producing the door, we apply a plurality of spaced apart stripes of adhesive 19 to the face 17 of the door panel, these stripes extending parallel to the direction of advancement of the panel during the manufacturing process. Advancement is advantageously provided by a pair of pull rolls 28 and 29 (see FIG. 4) which also serve to press the straps 18 against the panel 14. Depending upon the speed of operation and the materials of construction, a plurality of pairs of such rolls may be employed. We have found that a particularly useful adhesive for this purpose is Minnesota Mining and Manufacturing Company No. 1870 fabric adhesive which is advantageously utilized when the straps are thin sheet steel, viz., 16–30 gauge and where the corrugated medium is paperboard. The corrugated medium providing the door panels 14 is unwound from a parent roll normally manufactured elsewhere and follows along a predetermined path generally defined by the position of the draw rolls 28. For purposes of simplicity of disclosure, we have omitted the usual unwind spand and parent roll. We also provide (and omitted for the convenience of illustration) a plurality of reels of metal ribbon which provide the straps 18. The straps 18 are punched by means of die-carrying rolls 30 and 31 and the arrangement of the die punches is selected to provide either the through openings of the embodiments of FIGS. 1-2 or 3 of the embossments 120 of the embodiment of FIG. 5. Also, we employ transverse severing rolls as at 32 and 33 (still referring to FIG. 3) which served to transversely sever the ribbon 18' and advantageously in the arcuate form depicted at 21 in FIGS. 2 and 3. The adhesive stripes 19 are advantageously applied through the use of an adhesive applying roll 34 receiving adhesive from a reservoir 35 and the roll 34 operating against a backing roll 36. We arrange the adhesive applying roll 34 in such a fashion as to provide only a limited length stripe of adhesive for each door panel. The adhesive stripe 19 is limited so that the end portions of each strap 18, i.e., those overlying the flap portion 23, are not secured, thereby facilitating the development of the side flaps 23. Not shown in FIG. 4, but understood to be present is a means for transversely severing the corrugated medium into the various panels 14.

Now turning to the second sheet of drawings and with particular reference to FIG. 6, the numeral 14 again illustrates the inventive door but with a lesser number of horizontally extending, vertically spaced apart straps. This facilitates the description of this phase of the invention although it will be understood that the number of straps usually is constant, the number being determined by the height of the door. Also, it will be understood that the spacing of the straps may be varied — as, for example, providing a narrower or smaller vertical distance between the straps provided adjacent the lower portion of the door. The straps 18 in FIG. 6 may be secured to the door posts 13 in the usual fashion — making use of nails extending through the nailing positions 20 — this after the side flaps 23 have been developed through holding the side edges of the door panel about the vertical score of fold lines 22.

As seen in FIGS. 6 and 7, the ends of a given strap 18 are equipped with a fitting 37 which permits the installation or affixing thereto of an extension band 38. The extension band 38 is advantageously equipped with nail openings suitably spaced apart as at 39 and a nail 40 may be driven through a selected nail opening 39 into an adjacent stud 41.

As can be seen from FIG. 9, the connector or fitting 37 includes a box-shaped metal structure having a hollow configuration with open ends as at 42. The connector 37 is sized so as to receive a strap 18 through one end opening and an extension band 39 through the other end opening with the strap and extension band arranged in superposed relation, i.e., the thickness of the opening 42 being sufficient to accommodate essentially two strap thicknesses (see FIG. 10). The connector 37 is equipped with at least one tang 43 in one larger face and an oppositely directed tang 44 in the opposite side face. Thus, the tangs 43 and 44 are adapted to enter into the nail openings 39 and 20, respectively, and secure the strap and extension band in a secure, tension relationship.

Seen in FIG. 8 is the connector 37' in an intermediate stage of production. It will be appreciated that the connector 37 can be fashioned from a single piece of sheet steel suitably folded on itself in essentially S fashion, with the tangs 43 and 44 being provided initially in the flat, unfolded blank.

Reference is now made to the third sheet of drawings wherein a novel center brace structure is described for use in installations where the doors are quite wide, upwards of 7-10 feet or so. Again, the inventive door panels are designated by the numeral 14 and, as before, equipped with side battens 24 and bottom and top pry boards 27 and 28, all of these being secured to the door post 13.

Figure 14:
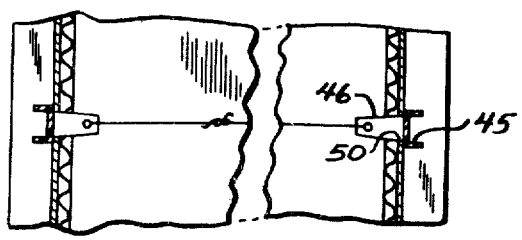
FIG. 14 is a sectional view in fragmentary form as seen along the sight line 14—14 of FIG. 12.
Figure 15:
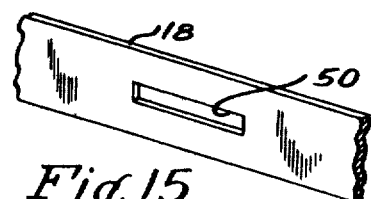
FIG. 15 is a fragmentary perspective view of a portion of the reinforcing strap employed in conjunction with the inventive center brace.

Centrally of each door we provide a center brace 45 which advantageously may be a U-shaped channel (see FIG. 14). Projecting inwardly from the U-shaped channel 45 is a horizontally flat tang 46. The tang 46 is equipped with an opening 47 adapted to receive a cross tie 48. It will be appreciated that either a single length of cross tie material can be used for the upper and lower opposed tang 46. The tangs 46 extend through slits 50 in the straps 18, the slits 50 being horizontally elongated. The straps therefor serve as a further bolster to confine the horizontally flat tang from any deformation. With this arrangement, it is possible to make use of a plastic member 45 (channel or otherwise) with metal tangs being fitted thereto.

We claim:

1. In a method of producing grain doors, the steps of advancing a generally rectangular double face corrugated panel along a predetermined path, applying a plurality of spaced apart stripes of adhesive to one face of said panel with said stripes extending parallel to said path while terminating each stripe a spaced distance inwardly of the adjacent end of said door panel to permit ready development of a side flap, unwinding a plurality of rolls of metal ribbon, one for each stripe and punching openings in each ribbon in a plurality of longitudinally aligned, equally spaced apart positions only adjacent each strap end to provide areas for nailing each strap end to a car door post, said openings being relatively elongated in the direction of said path, transversely, arcuately severing each ribbon to provide a strap for each stripe having a length slightly less than the panel dimension parallel to said path, and pressing a strap into engagement with each stripe.

* * * * *